United States Patent
Jang (10) Patent No.: US 8,972,127 B2
(45) Date of Patent: Mar. 3, 2015

(54) CONTROL SYSTEM FOR AUTOMATIC TRANSMISSION AND METHOD THEREOF

(71) Applicants: Hyundai Motor Company, Seoul (KR); Kia Motors Corporation, Seoul (KR)

(72) Inventor: Sung Hwan Jang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/649,862

(22) Filed: Oct. 11, 2012

(65) Prior Publication Data

US 2013/0096786 A1    Apr. 18, 2013

(30) Foreign Application Priority Data

Oct. 14, 2011 (KR) ......................... 10-2011-0105436

(51) Int. Cl.
  *F16H 61/02* (2006.01)
  *F16H 59/18* (2006.01)
  *F16H 59/72* (2006.01)
  *F16H 59/78* (2006.01)

(52) U.S. Cl.
  CPC ............ *F16H 61/0213* (2013.01); *F16H 59/18* (2013.01); *F16H 2059/183* (2013.01); *F16H 59/72* (2013.01); *F16H 59/78* (2013.01); *F16H 2061/0227* (2013.01)
  USPC .................................. 701/53; 701/55; 477/5

(58) Field of Classification Search
  CPC ....................................................... F16H 61/02
  USPC ............................................................ 701/53
  See application file for complete search history.

(56) References Cited

U.S. PATENT DOCUMENTS

| | | | | |
|---|---|---|---|---|
| 5,053,963 A * | 10/1991 | Mack | | 701/53 |
| 5,695,428 A * | 12/1997 | Yuasa et al. | | 477/48 |
| 5,842,948 A * | 12/1998 | Yuasa et al. | | 477/48 |
| 6,347,270 B1 * | 2/2002 | Takizawa et al. | | 701/53 |
| 6,945,907 B2 * | 9/2005 | Vornhem et al. | | 477/48 |
| 6,962,550 B2 * | 11/2005 | Kadota | | 477/15 |
| 7,247,127 B2 * | 7/2007 | Popp et al. | | 477/154 |
| 7,416,512 B2 * | 8/2008 | Kobayashi et al. | | 477/43 |
| 7,627,411 B2 * | 12/2009 | Kuwahara et al. | | 701/55 |
| 7,740,557 B2 * | 6/2010 | Kondo et al. | | 477/69 |

(Continued)

FOREIGN PATENT DOCUMENTS

| KR | 10-0289485 B1 | 5/2001 |
|---|---|---|
| KR | 10-0302804 B1 | 11/2001 |

*Primary Examiner* — Calvin Cheung
*Assistant Examiner* — Allen E Quillen
(74) *Attorney, Agent, or Firm* — Morgan, Lewis & Bockius LLP (57) ABSTRACT

The control system for an automatic transmission may include, a detecting portion of driving information adapted to detect the driving information including a temperature of an engine coolant, temperature of a transmission oil, a positional change of an accelerator pedal, a current shift-speed, and driving speed. a control portion adapted to determine a virtual positional change of the accelerator pedal based on an actual positional change of the accelerator pedal and a tip-in speed transmitted from the detecting portion of driving information, to determine a target shift-speed according to the actual positional change of the accelerator pedal or the virtual positional change of the accelerator pedal and the driving speed, and to control a shift to the target shift-speed. an actuator adapted to engage the target shift-speed according to a control signal received from the control portion.

14 Claims, 6 Drawing Sheets

(56) References Cited

U.S. PATENT DOCUMENTS

| | | |
|---|---|---|
| 7,771,310 B2 * | 8/2010 | Tanishima ................ 477/5 |
| 7,841,962 B2 * | 11/2010 | Boutell ................ 477/120 |
| 7,912,615 B2 * | 3/2011 | Lindgren et al. ........... 701/55 |
| 8,277,360 B2 * | 10/2012 | Matsubara et al. ............ 477/3 |
| 8,308,611 B2 * | 11/2012 | Rangaraju et al. .......... 477/135 |
| 8,409,056 B2 * | 4/2013 | Kuwahara et al. .......... 477/110 |
| 2010/0211275 A1 * | 8/2010 | Kobayashi et al. .......... 701/55 |
| 2010/0286878 A1 * | 11/2010 | Lindgren et al. ............ 701/54 |

* cited by examiner

CONTROL SYSTEM FOR AUTOMATIC TRANSMISSION AND METHOD THEREOF

CROSS-REFERENCE TO RELATED APPLICATION

The present application claims priority to Korean Patent Application No. 10-2011-0105436 filed in the Korean Intellectual Property Office on Oct. 14, 2011, the entire contents of which is incorporated herein for all purposes by this reference.

BACKGROUND OF THE INVENTION

1. Field of the Invention

The present invention relates to a control system for an automatic transmission and a method thereof. More particularly, the present invention relates to a control system for an automatic transmission and a method thereof that can provide shift-speed control improving acceleration responsiveness by determining a virtual positional change of an accelerator pedal $V_{APS}$ containing an acceleration intention from a positional change of the accelerator pedal $\Delta$ APS due to tip-in and a tip-in speed.

2. Description of Related Art

An automatic transmission includes a friction element, a state of which is changed from engagement to release and another friction element, a state of which is changed from release to engagement according to a shift control of a vehicle. Operations of the friction elements are controlled by hydraulic pressure. In addition, because performance of the automatic transmission is influenced by engagement or release timing of the friction elements, research has been carried out so as to improve shift performance further.

The automatic transmission includes a transmission control unit (TCU) for controlling the shift, and the transmission control unit determines a target shift-speed from a predetermined shift pattern map according to a driving speed and a positional change of an accelerator pedal (throttle valve opening). After the target shift-speed is determined, the transmission control unit controls the hydraulic pressure through an actuator (solenoid valve) such that an on-coming friction element is to be engaged and an off-going friction element is to be released. Therefore, the shift to the target shift-speed is controlled.

Because the predetermined shift pattern map of the automatic transmission is set so as to improve fuel economy, acceleration responsiveness may be deteriorated.

In addition, if the positional change of the accelerator pedal according to tip-in is within a reference range of upshift/downshift of the shift pattern map, the shift is not influenced by the positional change of the accelerator pedal. Therefore, upshift or downshift is not performed and a current shift-speed is maintained.

At this time, engine output rises and vehicle speed increases by the tip-in of the accelerator pedal. Because the shift-speed does not change, the vehicle speed increases only by the engine output and thus acceleration responsiveness may be deteriorated, however.

Figure 6:
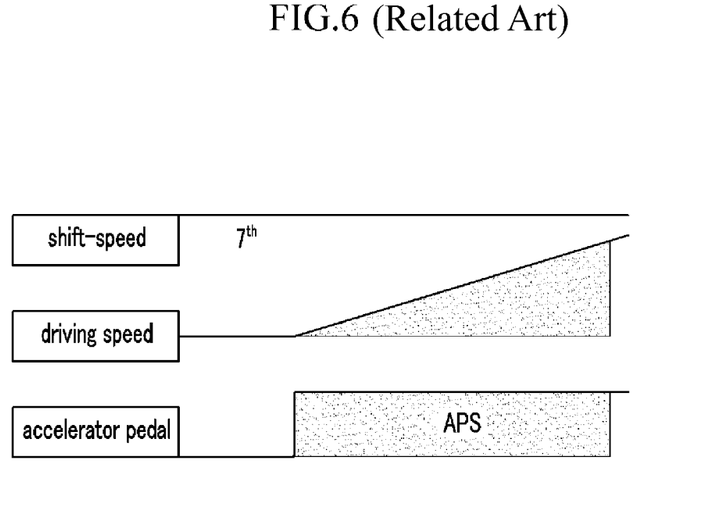
FIG. 6 is a schematic diagram for showing acceleration response according to a positional change of an accelerator pedal in a conventional automatic transmission.

For example, FIG. 6 illustrates a case where the positional change of the accelerator pedal occurs by the tip-in but the shift-speed does not change in a state of a seventh forward speed. That is, because the positional change of the accelerator pedal is within the reference range of upshift/downshift of the shift pattern map, the shift-speed is maintained to be the seventh forward speed that is a current shift-speed. In this case, the vehicle speed increases due to increase of the engine output.

Since the shift-speed, however, does not change, the vehicle speed changes slowly. Therefore, acceleration responsiveness may be insufficiently provided compared with acceleration intention of a driver according to the tip-in.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control system for an automatic transmission and a method thereof having advantages of improving acceleration responsiveness according to a tip-in speed by providing a first shift pattern map for determining a target shift-speed based on an actual positional change $\Delta$ APS of an accelerator pedal and a driving speed and a second shift pattern map for determining a target shift-speed based on a virtual positional change VAPS of the accelerator pedal determined according to the actual positional change $\Delta$ APS of the accelerator pedal and a tip-in speed (%/sec) and the driving speed.

In addition, a control system for an automatic transmission and a method thereof are provided according to an exemplary embodiment of the present invention, wherein the virtual positional change VAPS of the accelerator pedal determined according to the actual positional change of the accelerator pedal and the tip-in speed is adapted to contain acceleration intention of a driver. Since different target shift-speeds can be determined though the actual positional changes of the accelerator pedal are the same, acceleration performance may be improved.

In addition, a control system for an automatic transmission and a method thereof that return to a shift control at which the first shift pattern map is used after improving the acceleration responsiveness through a downshift performed based on the virtual positional change VAPS of the accelerator pedal containing the acceleration intention of the driver and determined according to the actual positional change of the accelerator pedal and the tip-in speed.

A control system for an automatic transmission according to an exemplary embodiment of the present invention may include, a detecting portion of driving information adapted to detect the driving information including a temperature of an engine coolant, temperature of a transmission oil, a positional change of an accelerator pedal, a current shift-speed, and driving speed, a control portion adapted to determine a virtual positional change of the accelerator pedal based on an actual positional change of the accelerator pedal and a tip-in speed transmitted from the detecting portion of driving information, to determine a target shift-speed according to the actual positional change of the accelerator pedal or the virtual positional change of the accelerator pedal and the driving speed, and to control a shift to the target shift-speed, an actuator adapted to engage the target shift-speed according to a control signal received from the control portion.

The control system may further include a memory portion storing a map in which the virtual positional change of the accelerator pedal according to the actual positional change of the accelerator pedal and the tip-in speed is set, a first shift pattern map in which the target shift-speed according to the actual positional change of the accelerator pedal and the driving speed is set, and a second shift pattern map in which the target shift-speed according to the virtual positional change of the accelerator pedal and the driving speed is set.

The control portion may be adapted to detect the actual positional change of the accelerator pedal and the tip-in speed in a case that the coolant temperature exists within a predetermined first temperature range, the oil temperature exists within a predetermined second temperature range, and the current shift-speed is higher than or equal to a third forward speed.

The control portion may be adapted to perform a shift control by applying the second shift pattern map in a case that the actual positional change of the accelerator pedal due to tip-in is greater than or equal to a predetermined first positional change and the tip-in speed is faster than or equal to a predetermined speed.

The control portion may be adapted to perform a shift control by applying the first shift pattern map in a case that the actual positional change of the accelerator pedal due to tip-in is smaller than a predetermined first positional change or the tip-in speed is slower than a predetermined speed.

The control portion may be adapted to downshift to the target shift-speed so as to improve acceleration responsiveness due to a high engine output and a low gear ratio when the shift is controlled by applying the second shift pattern map.

The control portion may be adapted to limit the virtual positional change of the accelerator pedal according to the actual positional change of the accelerator pedal and the tip-in speed such that the virtual positional change of the accelerator pedal does not exceed the actual positional change of the accelerator pedal by a limiting amount.

The control portion may be adapted to perform the shift control by applying the first shift pattern map when a predetermined release condition is satisfied in a state of performing the shift control by applying the second shift pattern map.

The predetermined release condition may be satisfied when the actual positional change of the accelerator pedal is smaller than or equal to a predetermined second positional change, a predetermined time has passed after downshifting to the target shift-speed, or a predetermined shift-speed is engaged.

A control method for an automatic transmission according to another exemplary embodiment of the present invention may include, determining whether a first condition is satisfied from driving information, determining, when the first condition is satisfied, whether an actual positional change of an accelerator pedal due to tip-in and a tip-in speed satisfies a second condition, determining a virtual positional change of the accelerator pedal according to the actual positional change of the accelerator pedal and the tip-in speed when the second condition is satisfied, determining a target shift-speed according to the virtual positional change of the accelerator pedal and a driving speed, controlling a shift to the target shift-speed according to the virtual positional change of the accelerator pedal and the driving speed.

If a predetermined release condition is satisfied in a state of controlling the shift to the target shift-speed according to the virtual positional change of the accelerator pedal and the driving speed, a shift to a target shift-speed according to the actual positional change of the accelerator pedal and the driving speed may be controlled.

The first condition may be satisfied when a coolant temperature exists within a predetermined first temperature range, an oil temperature exists within a predetermined second temperature range, and a current shift-speed is higher than or equal to a third forward speed.

The second condition may be satisfied when the actual positional change of the accelerator pedal due to the tip-in is greater than or equal to a predetermined first positional change and the tip-in speed is faster than or equal to a predetermined speed.

The target shift-speed according to the virtual positional change of the accelerator pedal and the driving speed may be determined to be a lower shift-speed than the current shift-speed.

The virtual positional change of the accelerator pedal determined based on the actual positional change of the accelerator pedal and the tip-in speed does not exceed the actual positional change of the accelerator pedal by a limiting amount.

The predetermined release condition may be satisfied when the actual positional change of the accelerator pedal is smaller than or equal to a predetermined second positional change, a predetermined time has passed after shifting to the target shift-speed according to the virtual positional change of the accelerator pedal and the driving speed, or a predetermined shift-speed is engaged.

A control system for an automatic transmission according to other exemplary embodiment of the present invention may include, a detecting portion of driving information adapted to detect the driving information including a temperature of an engine coolant, temperature of a transmission oil, a positional change of an accelerator pedal, a current shift-speed, and driving speed, a control portion adapted to control a shift of the automatic transmission based on the driving information detected by the detecting portion of driving information, wherein the control portion determines whether a shift control is possible, and selectively performs fuel economy-oriented shift control according to an actual positional change of the accelerator pedal and the driving speed or acceleration-oriented shift control according to a virtual positional change of the accelerator pedal and the driving speed if the shift control is possible.

The virtual positional change of the accelerator pedal may be determined according to the actual positional change of the accelerator pedal and a tip-in speed.

The virtual positional change of the accelerator pedal does not exceed the actual positional change of the accelerator pedal by a limiting amount.

The control portion may be adapted to perform the fuel economy-oriented shift control when a predetermined release condition is satisfied in a state of performing the acceleration-oriented shift control.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown.

As those skilled in the art would realize, the described embodiments may be modified in various different ways, without departing from the spirit or scope of the present invention. Description of components that are not necessary for explaining the present invention will be omitted.

Figure 1:
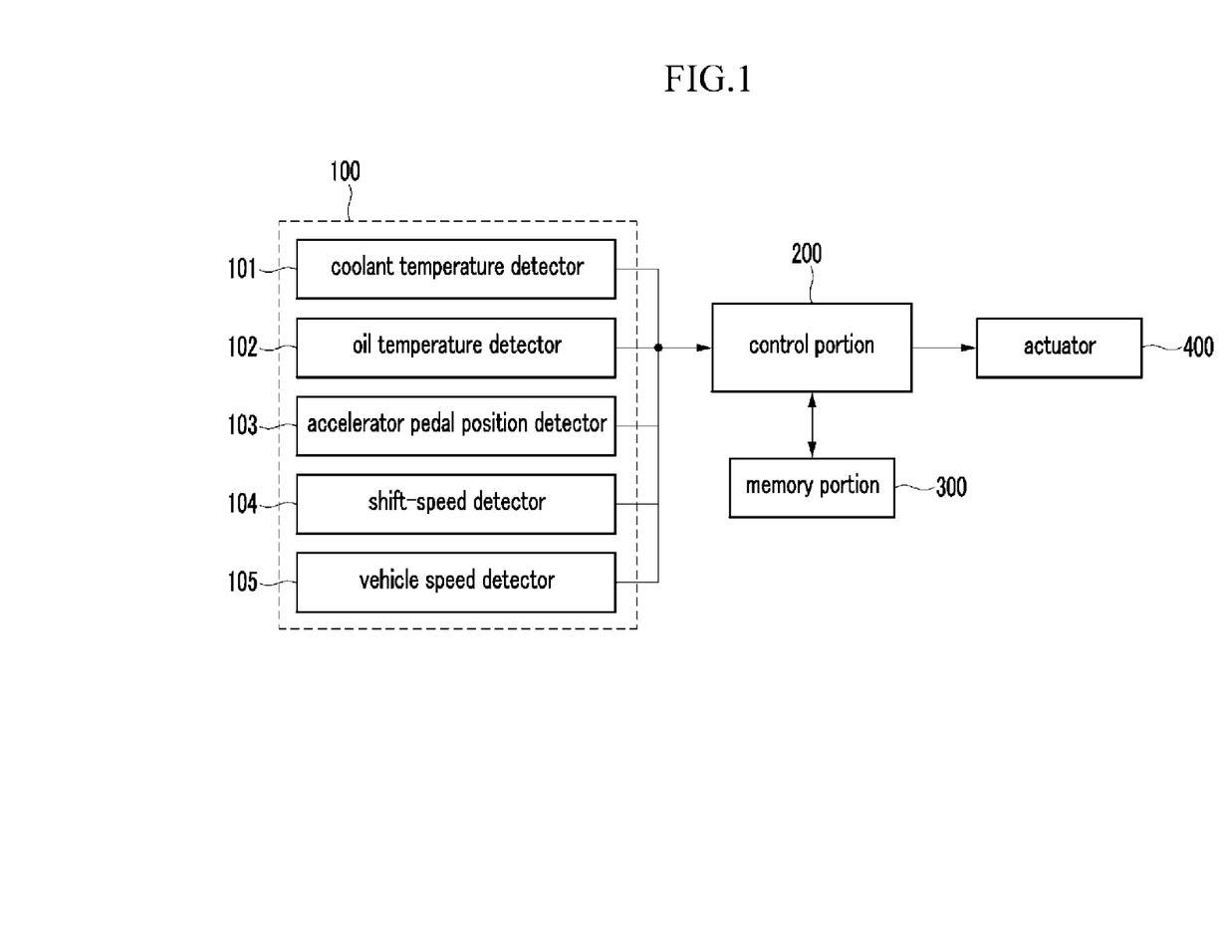
FIG. 1 is a block diagram of a control system for an automatic transmission according to an exemplary embodiment of the present invention.

FIG. 1 is a block diagram of a control system for an automatic transmission according to an exemplary embodiment of the present invention.

As shown in FIG. 1, an exemplary embodiment of the present invention includes a detecting portion 100 of driving information, a control portion 200, a memory portion 300, and an actuator 400.

The detecting portion 100 of driving information detects driving information during running of a vehicle to which an automatic transmission according to an exemplary embodiment of the present invention is applied, and transmits information corresponding thereto to the control portion 200.

The detecting portion 100 of driving information may include a coolant temperature detector 101, an oil temperature detector 102, an accelerator pedal position detector 103, a shift-speed detector 104, and a vehicle speed detector 105.

The coolant temperature detector 101 detects a temperature of a coolant circulating through an engine, and transmits information corresponding thereto to the control portion 200.

The oil temperature detector 102 detects a temperature of an oil that operates friction elements including clutches and brakes of the automatic transmission, and transmits information corresponding thereto to the control portion 200.

The accelerator pedal position detector 103 detects a positional change Δ APS of an accelerator pedal and a tip-in speed (%/sec) according to tip-in by a driver, and transmits information corresponding thereto to the control portion 200. An accelerator position sensor (APS) can be used as the accelerator pedal position detector 103.

The shift-speed detector 104 detects a current shift-speed that is engaged according to a driving speed and the positional change of the accelerator pedal, and transmits information corresponding thereto to the control portion 200.

The vehicle speed detector 105 detects a current driving speed, and transmits information corresponding thereto to the control portion 200.

The control portion 200 determines a target shift-speed according to the driving speed and the positional change of the accelerator pedal received from the detecting portion 100 of driving information by using a first shift pattern map stored in the memory portion 300, and controls the actuator 400 according to the determined target shift-speed so as to perform a shift control to the target shift-speed.

If the information received from the detecting portion 100 of driving information satisfies a first condition, the control portion 200 detects the positional change Δ APS of the accelerator pedal according to the tip-in and the tip-in speed (%/sec) and determines whether a second condition is satisfied.

The first condition is satisfied when the coolant temperature detected by the coolant temperature detector 101 exists within a predetermined first temperature range (a temperature range where it can be determined that warm-up of the engine is completed), the temperature of an automatic transmission oil detected by the oil temperature detector 102 exists within a predetermined second temperature range (a temperature range where it can be determined that the oil is sufficiently activated), and the current shift-speed detected by the shift-speed detector 104 is higher than or equal to a third forward speed.

In addition, the first condition further includes that system error is not detected and error in CAN communication is not detected.

Herein, the first condition means a condition where the control portion 200 can control a shift.

In addition, the second condition is satisfied when the positional change Δ APS of the accelerator pedal according to the tip-in is greater than or equal to a predetermined first positional change (%) and the tip-in speed (%/sec) is faster than or equal to a predetermined speed.

The predetermined first positional change may be 10% but can be changed depending on design scheme.

In addition, the predetermined speed, for example, may be 53%/sec but can be changed depending on design scheme.

Herein, the second condition means a condition where the control portion 200 controls the shift so as to improve acceleration responsiveness.

If the information received from the detecting portion 100 of driving information satisfies the first condition and the second condition, the control portion 200 determines a virtual positional change VAPS of the accelerator pedal according to the positional change Δ APS of the accelerator pedal and the tip-in speed (%/sec) by using a map stored in the memory portion 300. That is, the virtual positional change VAPS of the accelerator pedal contains acceleration intention of the driver.

In addition, the control portion 200 determines the target shift-speed by using a second shift pattern map according to the virtual positional change VAPS of the accelerator pedal stored in the memory portion 300, and controls the shift through the actuator 400. In this case, the control portion 200 can improve the acceleration responsiveness by performing a downshift.

If a predetermined release condition is satisfied after the control portion 200 performs the downshift by applying the second shift pattern map according to the virtual positional change VAPS of the accelerator pedal containing the acceleration intention and determined from the positional change Δ APS of the accelerator pedal and the tip-in speed, the control portion 200 performs the shift control by using the first shift pattern map to which the actual positional change Δ APS of the accelerator pedal is applied so as to enhance fuel economy.

The release condition is satisfied when the positional change Δ APS of the accelerator pedal is smaller than or equal to a predetermined second positional change (%), for example 10%, a predetermined time has passed after downshifting by using the second shift pattern map according to the virtual positional change VAPS of the accelerator pedal, or a predetermined shift-speed is engaged.

The control portion 200 is adapted to limit the virtual positional change VAPS of the accelerator pedal according to the positional change Δ APS of the accelerator pedal and the tip-in speed (%/sec) such that the virtual positional change VAPS of the accelerator pedal does not exceed the actual positional change of the accelerator pedal Δ APS by a limiting amount (%).

The limiting amount may be 35% but can be changed depending on design scheme.

The map at which the virtual positional change VAPS of the accelerator pedal according to the positional change Δ APS of the accelerator pedal and the tip-in speed (%/sec) is set is stored in the memory portion 300.

The first shift pattern map at which the target shift-speed according to the actual positional change of the accelerator pedal APS and the driving speed is set and the second shift pattern map at which the target shift-speed according to the virtual positional change VAPS of the accelerator pedal and the driving speed is set are stored in the memory portion 300.

Figure 3:
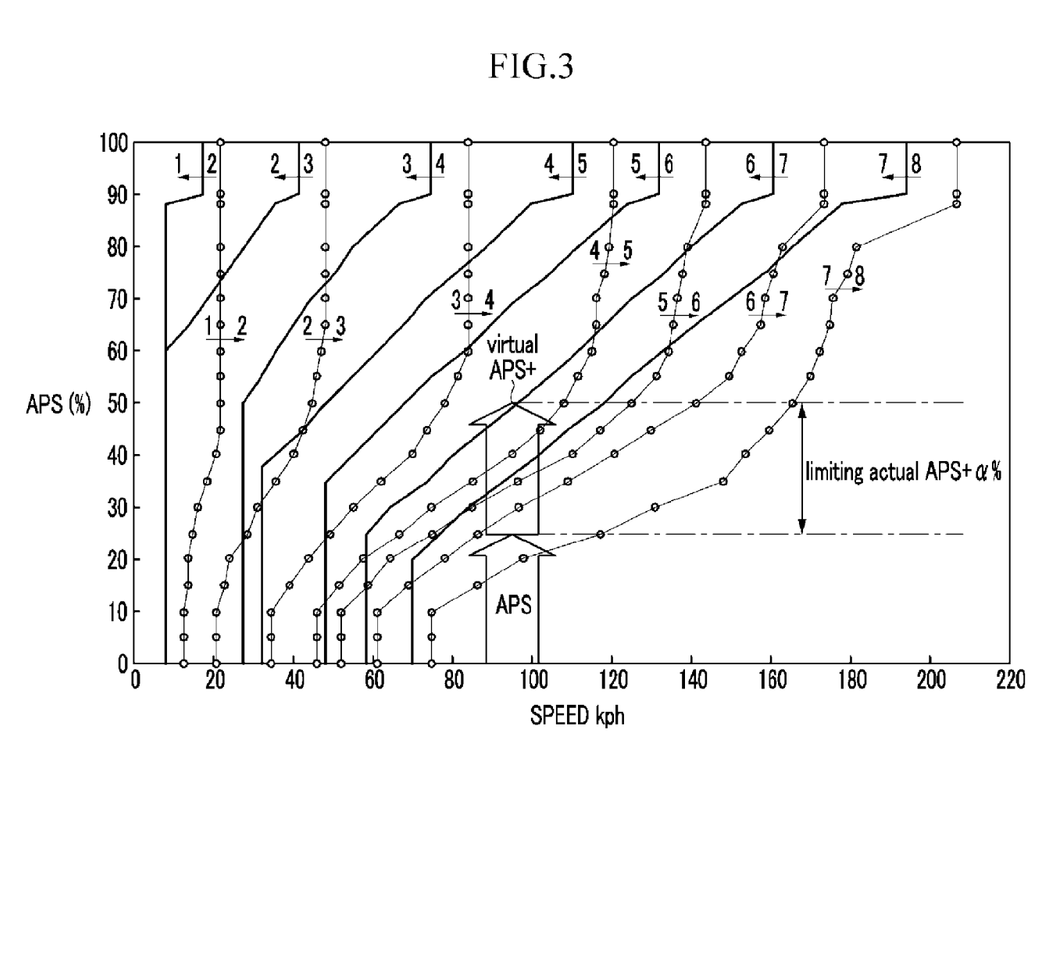
FIG. 3 is a schematic diagram for showing an example of a shift pattern map applied to a control system for an automatic transmission according to an exemplary embodiment of the present invention.

An eight-speed shift pattern map according to the virtual positional change VAPS of the accelerator pedal stored in the memory portion 300, for example, are shown in FIG. 3.

The second shift pattern map according to the virtual positional change VAPS of the accelerator pedal stored in the memory portion 300 is adapted to determine the target shift-speed for improving the acceleration responsiveness in a state that the positional change Δ APS of the accelerator pedal according to the tip-in is greater than or equal to the first positional change (e.g., 10%) and the current shift-speed is higher than or equal to the third forward speed.

The virtual positional change VAPS of the accelerator pedal stored in the memory portion 300 may be limited so as not to exceed the actual positional change of the accelerator pedal APS by the limiting amount (%).

The limiting amount, for example, may be 35%, but can be changed depending on vehicle models and design scheme.

The actuator 400 includes at least one solenoid valve operating friction elements including clutches and brakes, and is adapted to engage the target shift-speed according to a control signal of the control portion 200.

Hereinafter, a control method for an automatic transmission according to an exemplary embodiment of the present invention will be described in detail with reference to the accompanying drawings.

In the automatic transmission according to an exemplary embodiment of the present invention, a shift control according to the actual positional change of the accelerator pedal and the driving speed is similar to a conventional shift control. Therefore, detailed description of the shift control according to the actual positional change of the accelerator pedal and the driving speed will be omitted.

Figure 2:
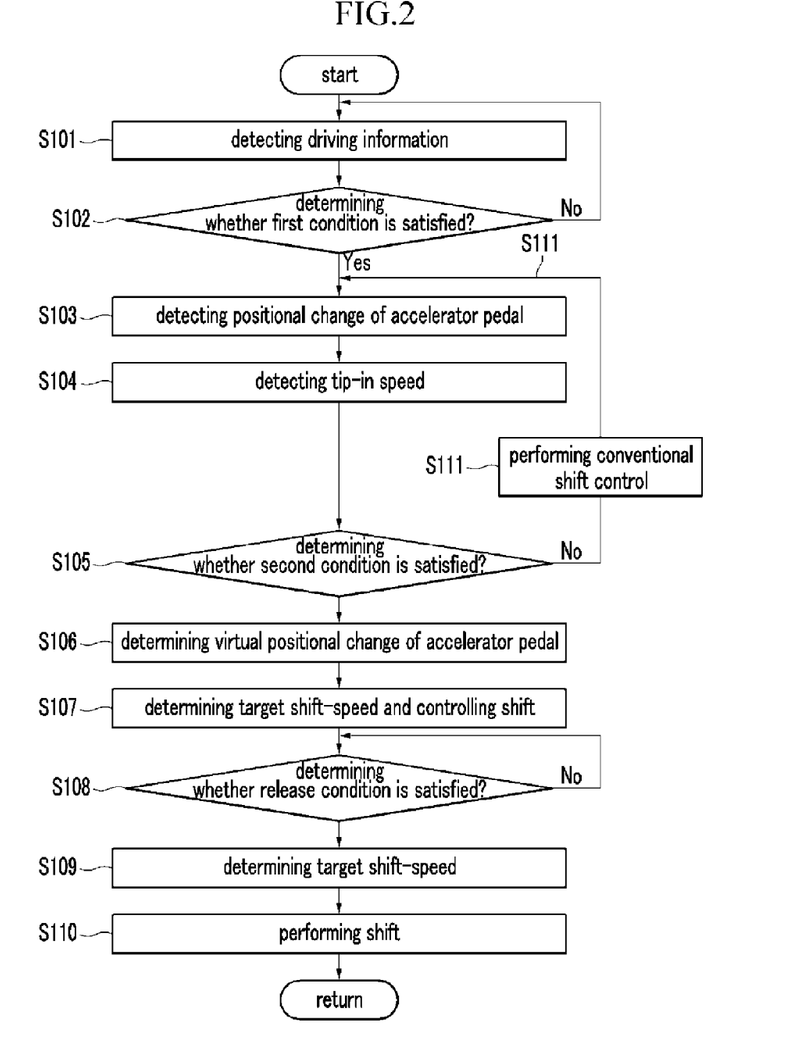
FIG. 2 is a flowchart of a control method for an automatic transmission according to an exemplary embodiment of the present invention.

If the vehicle in which the automatic transmission according to an exemplary embodiment of the present invention is used runs, the detecting portion 100 of driving information detects the driving information at a step S101 and transmits the driving information to the control portion 200.

The information transmitted from the detecting portion 100 of driving information to the control portion 200 includes the temperature of the coolant circulating through the engine, the temperature of the oil operating the friction elements including the clutches and the brakes, the current positional change (i.e., position) of the accelerator pedal, the current shift-speed engaged according to the driving speed and the positional change of the accelerator pedal, and the driving speed.

At this time, the control portion 200 analyses the information transmitted from the detecting portion 100 of driving information and determines whether the first condition is satisfied at a step S102.

The first condition is satisfied when the coolant temperature exists within the predetermined first temperature range, the oil temperature exists within the predetermined second temperature range, and the current shift-speed is higher than or equal to the third forward speed.

In addition, the first condition further includes that system error is not detected and error in CAN communication is not detected.

If the first condition is not satisfied at the step S102, the control portion 200 returns to the step S101.

That is, the control portion 200 determines that the first condition is not satisfied if the coolant temperature does not exist within the first temperature range, the oil temperature does not exist within the second temperature range, or the shift-speed is lower than the third forward speed.

The first condition, however, is satisfied at the step S102, the control portion 200 detects the positional change Δ APS of the accelerator pedal according to the tip-in from the accelerator pedal position detector 103 of the detecting portion 100 of driving information at a step S103 and detects the tip-in speed (%/sec) at a step S104. After that, the control portion 200 determines whether the second condition is satisfied based on the positional change Δ APS of the accelerator pedal according to the tip-in and the tip-in speed (%/sec) at a step S105.

The second condition is satisfied when the positional change Δ APS of the accelerator pedal according to the tip-in is greater than or equal to the predetermined first positional change (e.g., 10%) and the tip-in speed (%/sec) is faster than or equal to the predetermined speed.

The predetermined speed may be 53%/sec but can be changed according to vehicle models and design scheme.

If the positional change Δ APS of the accelerator pedal according to the tip-in and the tip-in speed (%/sec) does not satisfy the second condition at the step S105, the control portion 200 performs a conventional shift control (a shift control using the first shift pattern map) at a step S111, and returns to the step S103.

If the positional change Δ APS of the accelerator pedal according to the tip-in and the tip-in speed (%/sec) satisfy the second condition at the step S105, the control portion 200 determines the virtual positional change VAPS of the accelerator pedal according to the positional change Δ APS of the accelerator pedal and the tip-in speed (%/sec) containing acceleration intention by using the map stored in the memory portion 300 at a step S106.

After that, the control portion 200 determines the target shift-speed by using the second shift pattern map according to the virtual positional change VAPS of the accelerator pedal stored in the memory portion 300 and controls downshift through the actuator 400 at a step S 107. Therefore, acceleration responsiveness may be improved.

At this time, the control portion 200 limits the virtual positional change VAPS of the accelerator pedal determined according to the positional change Δ APS of the accelerator pedal and the tip-in speed (%/sec) so as not to exceed the actual positional change Δ APS of the accelerator pedal by the limiting amount (%).

The limiting amount may be 35% but can be changed according to design scheme.

As described above, in a state that the downshift is controlled by using the virtual positional change VAPS of the accelerator pedal determined based on the positional change Δ APS of the accelerator pedal and the tip-in speed (%/sec), the control portion 200 determines whether the predetermined release condition is satisfied at a step S108.

The release condition is satisfied when the positional change Δ APS of the accelerator pedal is smaller than or equal to the predetermined second positional change (e.g., 10%), the predetermined time has passed after downshift by using the virtual positional change VAPS of the accelerator pedal is completed, or the predetermined shift-speed is engaged.

If the release condition is satisfied at the step S108, the control portion 200 determines the target shift-speed based on the actual positional change Δ APS of the accelerator pedal and the driving speed by using the first shift pattern map stored in the memory portion 300 at a step S109. After that, the control portion 200 controls a shift to the target shift-speed through the actuator 400 at a step S110. The first shift pattern map is a conventional shift pattern map, and fuel economy may be improved by using the first shift pattern map.

Figure 4:
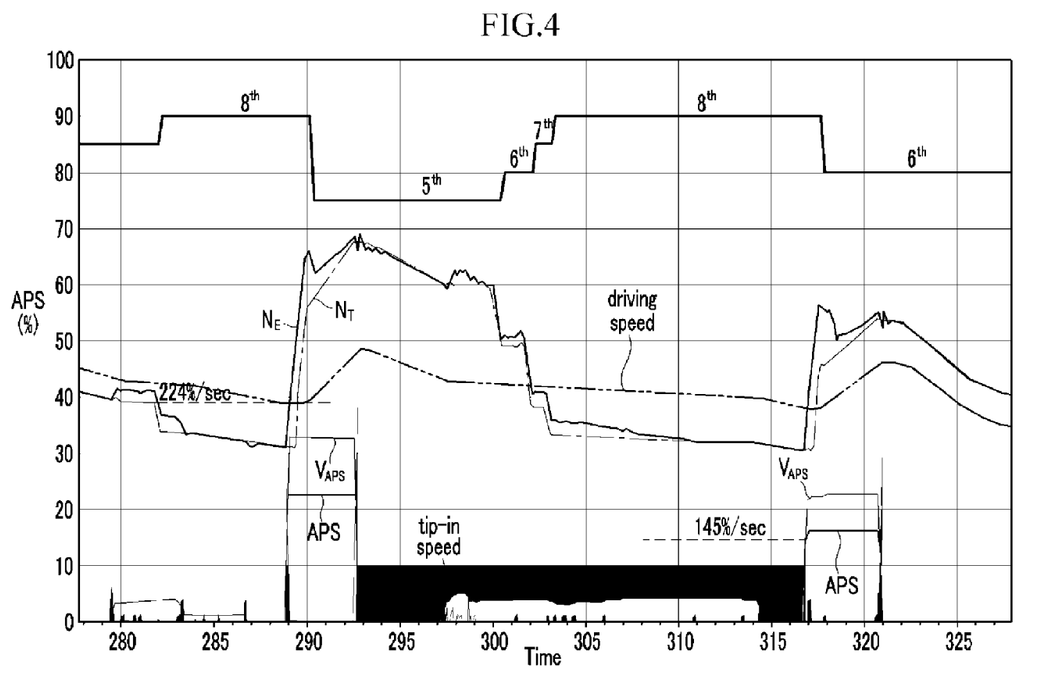
FIG. 4 and FIG. 5 are graphs for showing shift states when a virtual positional change of an accelerator pedal is applied to a control method for an automatic transmission according to an exemplary embodiment of the present invention.
Figure 5:
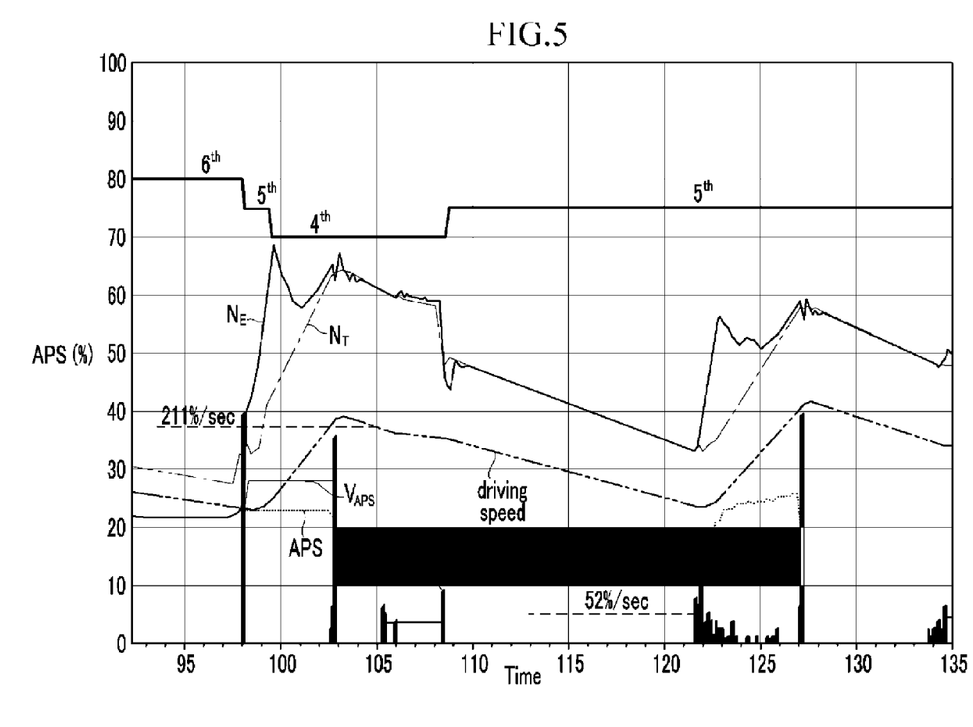

FIG. 4 and FIG. 5 are graphs for showing shift states when a virtual positional change of an accelerator pedal is applied to a control method for an automatic transmission according to an exemplary embodiment of the present invention.

In a state that the vehicle runs with an eighth forward speed, the positional change Δ APS of the accelerator pedal according to the tip-in is 22% and the tip-in speed is 224%/sec, as shown in FIG. 4. In this case, sudden tip-in occurs and it is determined that the driver wants to accelerate quickly.

Therefore, the virtual positional change VAPS of the accelerator pedal is determined according to the positional change of the accelerator pedal (22%) and the tip-in speed (224%/sec) by using the map stored in the memory portion 300.

At this time, the virtual positional change VAPS of the accelerator pedal, as shown in FIG. 4, is determined to be about 32% that is higher than the actual positional change Δ APS of the accelerator pedal by 10%.

In this case, the target shift-speed determined according to the virtual positional change VAPS of the accelerator pedal and the driving speed is a fifth forward speed.

That is, if the positional change Δ APS of the accelerator pedal is 22% and the tip-in speed is 224%/sec in a state of the eighth forward speed, the control portion 200 controls the downshift from the eighth forward speed to the fifth forward speed.

Therefore, acceleration responsiveness may be improved due to increase of engine output $N_E$ according to the positional change of the accelerator pedal and increase of turbine speed $N_T$ according to the downshift.

If the release condition is satisfied in a state that the shift is controlled by using the virtual positional change VAPS of the accelerator pedal, the control portion 200 uses the first shift pattern map. That is, the shift to the target shift-speed according to the actual positional change of the accelerator pedal and the driving speed is controlled.

In this case, the shift-speed is heightened in a sequence of fifth forward speed→ sixth forward speed→ seventh forward speed→ eighth forward speed. Since the shift is controlled according to the first shift pattern map, fuel economy may be improved.

If the positional change Δ APS of the accelerator pedal is 18% and the tip-in speed is 145%/sec at this state, sudden tip-in occurs and it is determined that the driver wants to accelerate quickly.

Therefore, the virtual positional change VAPS of the accelerator pedal is determined according to the positional change of the accelerator pedal (18%) and the tip-in speed (145%/sec) by using the map stored in the memory portion 300.

At this time, the virtual positional change VAPS of the accelerator pedal, as shown in FIG. 4, is determined to be about 22% that is higher than the actual positional change Δ APS of the accelerator pedal by 4%.

In this case, the target shift-speed determined according to the virtual positional change VAPS of the accelerator pedal and the driving speed is a sixth forward speed.

That is, if the positional change Δ APS of the accelerator pedal is 18% and the tip-in speed is 145%/sec in a state of the eighth forward speed, the control portion 200 controls downshift from the eighth forward speed to the sixth forward speed.

Therefore, acceleration responsiveness may be improved due to increase of engine output $N_E$ according to the positional change of the accelerator pedal and increase of turbine speed $N_T$ according to the downshift.

If the release condition is satisfied in a state that the shift is controlled by using the virtual positional change VAPS of the accelerator pedal (not shown in FIG. 4), the control portion 200 uses the first shift pattern map. In this case, the shift-speed is heightened in a sequence of sixth forward speed→seventh forward speed→eighth forward speed. Therefore, fuel economy may be improved.

In a state that the vehicle runs with the fifth forward speed, the positional change Δ APS of the accelerator pedal is 22% and the tip-in speed is 52%/sec that is smaller than the predetermined speed, as shown in FIG. 5. In this case, it is determined that the driver does not want to accelerate quickly and the fifth forward speed that is the current shift-speed is maintained.

According to an exemplary embodiment of the present invention, acceleration intention of the driver is determined according to the tip-in speed of the accelerator pedal and the shift control is performed by reflecting the acceleration intention of the driver. Therefore, acceleration responsiveness may be improved. In addition, reliability of the automatic transmission vehicle may be provided.

In addition, the virtual positional change of the accelerator pedal containing the acceleration intention is determined based on the positional change of the accelerator pedal and the tip-in speed, and the downshift to the target shift-speed according to the virtual positional change of the accelerator pedal is performed. Therefore, quick acceleration responsiveness may be provided due to increase in the engine output and low gear ratio.

Because quick acceleration or slow acceleration is determined based on the positional change of the accelerator pedal and the tip-in speed and different shift-speeds are engaged according to the quick acceleration or the slow acceleration, different acceleration responsiveness can be provided at the same positional change of the accelerator pedal.

Because the conventional shift control is performed after the acceleration responsiveness is provided by using the virtual positional change of the accelerator pedal containing the acceleration intention, fuel economy may be enhanced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control system for an automatic transmission, including: a detecting portion of detecting a driving information including a temperature of an engine coolant, a temperature of a transmission oil, a positional change of an accelerator pedal, a current shift-speed, and a driving speed;
 a control portion determining a virtual positional change of the accelerator pedal based on an actual positional change of the accelerator pedal and a tip-in speed transmitted from the detecting portion, to determine a target shift-speed according to the actual positional change of the accelerator pedal or the virtual positional change of the accelerator pedal and the driving speed, and to control a shift to the target shift-speed;
 an actuator engaging the target shift-speed according to a control signal received from the control portion;
 a memory portion storing a map in which the virtual positional change of the accelerator pedal according to the actual positional change of the accelerator pedal and the tip-in speed is set, a first shift pattern map in which the target shift-speed according to the actual positional change of the accelerator pedal and the driving speed is set, and a second shift pattern map in which the target shift-speed according to the virtual positional change of the accelerator pedal and the driving speed is set;
 wherein the control portion detects the actual positional change of the accelerator pedal and the tip-in speed when the temperature of the engine coolant exists within a predetermined first temperature range, the temperature of the transmission oil exists within a predetermined second temperature range, and the current shift-speed is higher than or equal to a third forward speed; and
 wherein the control portion performs a shift control by applying the second shift pattern map when the actual positional change of the accelerator pedal due to tip-in is greater than or equal to a predetermined first positional change and the tip-in speed is faster than or equal to a predetermined speed.

2. The control system of claim 1, wherein the control portion performs a shift control by applying the first shift pattern map when the actual positional change of the accelerator pedal due to tip-in is smaller than a predetermined first positional change or the tip-in speed is slower than a predetermined speed.

3. The control system of claim 1, wherein the control portion is configured to downshift to the target shift-speed so as to improve acceleration responsiveness due to a high engine output and a low gear ratio when the shift is controlled by applying the second shift pattern map.

4. The control system of claim 1, wherein the control portion is configured to limit the virtual positional change of the accelerator pedal according to the actual positional change of the accelerator pedal and the tip-in speed such that the virtual positional change of the accelerator pedal does not exceed the actual positional change of the accelerator pedal by a limiting amount.

5. The control system of claim 1, wherein the control portion is configured to perform the shift control by applying the first shift pattern map when a predetermined release condition is satisfied in a state of performing the shift control by applying the second shift pattern map.

6. The control system of claim 5, wherein the predetermined release condition is satisfied when the actual positional change of the accelerator pedal is smaller than or equal to a predetermined second positional change, a predetermined time has passed after downshifting to the target shift-speed, or a predetermined shift-speed is engaged.

7. A control method for a control system of an automatic transmission, comprising:
 determining whether a first condition is satisfied from a driving information;
 determining, when the first condition is satisfied, whether an actual positional change of an accelerator pedal due to tip-in and a tip-in speed satisfies a second condition;
 determining a virtual positional change of the accelerator pedal according to the actual positional change of the accelerator pedal and the tip-in speed when the second condition is satisfied;
 determining a target shift-speed according to the virtual positional change of the accelerator pedal and a driving speed by applying a second shift pattern map in which the target shift-speed according to the virtual positional change of the accelerator pedal and the driving speed is set, after the second condition is satisfied; and
 controlling a shift to the target shift-speed according to the virtual positional change of the accelerator pedal and the driving speed;
 wherein the first condition is satisfied when a coolant temperature exists within a predetermined first temperature range, an oil temperature of the automatic transmission exists within a predetermined second temperature range, and a current shift-speed is higher than or equal to a third forward speed;
 wherein the second condition is satisfied when the actual positional change of the accelerator pedal due to the tip-in is greater than or equal to a predetermined first positional change and the tip-in speed is faster than or equal to a predetermined speed, and
 wherein the control system includes:
  a detecting portion of detecting the driving information; and
  an actuator engaging the target shift-speed according to the virtual positional change of the accelerator pedal and the driving speed; and
  wherein, satisfaction of a predetermined release condition in a state of controlling the shift to the target shift-speed according to the virtual positional change of the accelerator pedal and the driving speed, results in control of a shift to the target shift-speed according to the actual positional change of the accelerator pedal and the driving speed by applying a first shift pattern map in which the target shift-speed according to the actual positional change of the accelerator pedal and the driving speed is set.

8. The control method of claim 7, wherein the target shift-speed according to the virtual positional change of the accelerator pedal and the driving speed is determined to be a lower shift-speed than the current shift-speed.

9. The control method of claim 7, wherein the virtual positional change of the accelerator pedal determined based on the actual positional change of the accelerator pedal and the tip-in speed does not exceed the actual positional change of the accelerator pedal by a limiting amount.

10. The control method of claim 7, wherein the predetermined release condition is satisfied when the actual positional change of the accelerator pedal is smaller than or equal to a predetermined second positional change, a predetermined time has passed after shifting to the target shift-speed according to the virtual positional change of the accelerator pedal and the driving speed, or a predetermined shift-speed is engaged.

11. A control system for an automatic transmission, including:
- a detecting portion configured to detect a driving information including a temperature of an engine coolant, a temperature of a transmission oil, a positional change of an accelerator pedal, a current shift-speed, and a driving speed;
- a control portion configured to control a shift of the automatic transmission based on the driving information detected by the detecting portion; and
- a memory portion storing a first shift pattern map in which a target shift-speed according to an actual positional change of the accelerator pedal and the driving speed is set, and a second shift pattern map in which the target shift-speed according to a virtual positional change of the accelerator pedal and the driving speed is set;
- wherein the control portion determines whether a shift control is possible, and selectively performs fuel economy-oriented shift control according to an actual positional change of the accelerator pedal and the driving speed or acceleration-oriented shift control according to the virtual positional change of the accelerator pedal and the driving speed when the shift control is possible;
- wherein the control portion performs a shift control when the actual positional change of the accelerator pedal due to tip-in is greater than or equal to a predetermined first positional change and a tip-in speed is faster than or equal to a predetermined speed by applying the second shift pattern map.

12. The control system of claim 11, wherein the virtual positional change of the accelerator pedal is determined according to the actual positional change of the accelerator pedal and the tip-in speed.

13. The control system of claim 12, wherein the virtual positional change of the accelerator pedal does not exceed the actual positional change of the accelerator pedal by a limiting amount.

14. The control system of claim 11, wherein the control portion is configured to perform the fuel economy-oriented shift control when a predetermined release condition is satisfied in a state of performing the acceleration-oriented shift control by applying the first shift pattern map.

* * * * *